F. G. HENNING & H. S. JONES.
GAS PIPE TERMINAL.
APPLICATION FILED SEPT. 10, 1915.
1,278,464.
Patented Sept. 10, 1918.
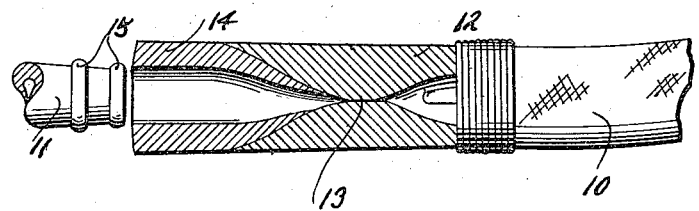
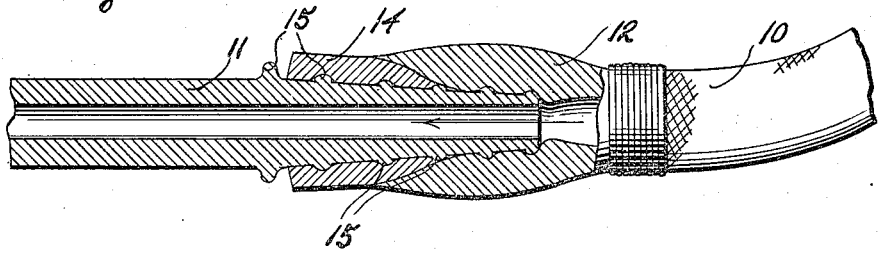
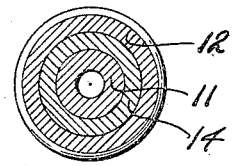
INVENTOR
Frederick G. Henning.
Howard S. Jones.
WITNESSES
BY
ATTORNEY

UNITED STATES PATENT OFFICE.

FREDERICK G. HENNING AND HOWARD S. JONES, OF BROOKLYN, NEW YORK.

GAS-PIPE TERMINAL.

1,278,464.

Specification of Letters Patent.

Patented Sept. 10, 1918.

Application filed September 10, 1915. Serial No. 50,003.

*To all whom it may concern:*

Be it known that we, FREDERICK G. HENNING and HOWARD S. JONES, citizens of the United States, residing at Brooklyn, in the county of Kings and State of New York, have invented certain new and useful Improvements in Gas-Pipe Terminals, of which the following is a specification.

This invention relates to a terminal of a pipe such as for conveying gas from a gas jet to a gas stove or other article which is heated or lighted by gas and the principal object of the invention is to so construct the terminal that in case the pipe becomes disconnected from the stove the pipe will be closed and thus the escape of gas through the pipe prevented.

Another object of the invention is to so construct this device that it may easily accommodate itself to the size of the stem inserted into the terminal and thus a tight connection provided which will prevent leakage between the stem and the gas pipe.

This invention is illustrated in the accompanying drawings, wherein:—

Figure 1 is a view showing the terminal in longitudinal section before being fitted upon the stem.

Fig. 2 is a view similar to Fig. 1 showing the pipe connected with the stem of the stove.

Fig. 3 is a transverse sectional view through the structure shown in Fig. 2.

The conductor pipe 10 may be permanently or removably connected with a gas jet in any suitable manner and is provided at its free end with a coupling 12 which forms the subject matter of this invention and which is so constructed that when the gas pipe becomes disconnected from the stem 11 of a gas stove or other article, the coupling will close as shown in Fig. 1 thus preventing gas from passing out of the pipe 10. This coupling 12 is formed of soft rubber or other material which may be distorted and then return of itself to its original form and is provided with the thickened central portion forming the mouth 13 which is positioned at the inner end of the mouth piece 14 which mouth piece is formed of a harder rubber than the body portion 12.

There has therefore been provided a relatively soft body portion for forming a tight closure when in the position shown in Fig. 1 and a tight engagement with the stem 11 when in the form shown in Fig. 2 and a relatively hard mouth piece extending into the body portion as shown in Figs. 1 and 2 so that the coupling can be forced upon the stem 11 without being injured by the rim 15 cutting the interior of the mouth piece. When this device is in use it is easy to place the same upon the stem and easy to remove the coupling from the stem. At the same time danger of leakage is prevented as a tight closure is formed when in the position shown in Fig. 1 and a tight binding engagement with the stem created when in the position shown in Fig. 2.

What is claimed is:—

A pipe terminal comprising a pipe section, a comparatively soft flexible coupling mounted upon said pipe section, said flexible coupling having a longitudinal passage decreasing in diameter gradually from its central portion to its opposite ends, the opposite walls of the passage normally meeting at the longitudinal center of said passage, and a comparatively hard guide member located in one end of said passage to guide a pipe stem to position within the central portion of said passage.

In testimony whereof we affix our signatures in presence of two witnesses.

FREDERICK G. HENNING.
HOWARD S. JONES.

Witnesses:
WM. J. COFFEY,
W. J. BOYLE.

Copies of this patent may be obtained for five cents each, by addressing the "Commissioner of Patents, Washington, D. C."